United States Patent
Beaudoin et al.

(10) Patent No.: US 10,590,523 B2
(45) Date of Patent: *Mar. 17, 2020

(54) ABRADABLE SEAL AND METHOD OF PRODUCING A SEAL

(71) Applicant: United Technologies Corporation, Farmington, CT (US)

(72) Inventors: Charles R. Beaudoin, Lyman, ME (US); Christopher W. Strock, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,333

(22) Filed: Feb. 1, 2018

(65) Prior Publication Data

US 2018/0171462 A1    Jun. 21, 2018

Related U.S. Application Data

(63) Continuation of application No. 14/728,631, filed on Jun. 2, 2015, now Pat. No. 9,896,756.

(51) Int. Cl.
  *C23C 4/067* (2016.01)
  *C23C 4/134* (2016.01)
  (Continued)

(52) U.S. Cl.
  CPC .............. *C23C 4/067* (2016.01); *C23C 4/134* (2016.01); *F01D 11/122* (2013.01); *F01D 11/125* (2013.01); *F16J 15/44* (2013.01); *F05D 2220/32* (2013.01); *F05D 2230/31* (2013.01); *F05D 2230/311* (2013.01); *F05D 2230/90* (2013.01); *F05D 2240/55* (2013.01); *F05D 2300/121* (2013.01);
  (Continued)

(58) Field of Classification Search
  None
  See application file for complete search history.

(56) References Cited

U.S. PATENT DOCUMENTS 3,723,165 A * 3/1973 Longo ...................... B05D 1/10
                                                                 277/922
4,696,855 A * 9/1987 Pettit, Jr. ................. B05B 7/226
                                                                 427/201
(Continued)

FOREIGN PATENT DOCUMENTS

EP       1010861 A2 *  6/2000  ............... C23C 4/04
EP       1010861 A2     6/2000
(Continued)

OTHER PUBLICATIONS

Metco 52C-NS datasheet, Metco Co, pp. 1-3, DSMTS-0045.5, 2016.*

(Continued)

*Primary Examiner* — Peter A Salamon
(74) *Attorney, Agent, or Firm* — Cantor Colburn LLP

(57) ABSTRACT

An air seal for use in a gas turbine engine. The seal includes a thermally sprayed abradable seal layer. The abradable material is composed of aluminum powder forming a metal matrix, and co-deposited methyl methacrylate particles and/or hexagonal boron nitride particles embedded as filler in the metal matrix.

20 Claims, 3 Drawing Sheets

(51) Int. Cl.
*F01D 11/12* (2006.01)
*F16J 15/44* (2006.01)

(52) U.S. Cl.
CPC .. *F05D 2300/2282* (2013.01); *F05D 2300/43* (2013.01); *F05D 2300/50* (2013.01); *F05D 2300/611* (2013.01); *F05D 2300/615* (2013.01); *Y02T 50/672* (2013.01)

(56) References Cited

U.S. PATENT DOCUMENTS

| | | | | |
|---|---|---|---|---|
| 4,917,960 | A * | 4/1990 | Hornberger | C09D 1/00 428/550 |
| 5,196,471 | A * | 3/1993 | Rangaswamy | C23C 4/04 428/403 |
| 5,434,210 | A * | 7/1995 | Rangaswamy | C23C 4/04 428/403 |
| 5,506,055 | A * | 4/1996 | Dorfman | C23C 4/06 428/407 |
| 5,536,022 | A * | 7/1996 | Sileo | C23C 4/02 277/415 |
| 6,089,825 | A * | 7/2000 | Walden | C23C 4/04 415/173.4 |
| 6,352,264 | B1 | 3/2002 | Dalzell, Jr. | |
| 7,892,652 | B2 | 2/2011 | Strock | |
| 9,896,756 | B2 * | 2/2018 | Beaudion | C23C 4/134 |
| 2003/0228483 | A1 * | 12/2003 | Fiala | B22F 3/115 428/564 |
| 2008/0226879 | A1 | 9/2008 | Strock | |
| 2009/0136740 | A1 * | 5/2009 | Reynolds | C23C 4/06 428/325 |
| 2011/0027573 | A1 * | 2/2011 | Strock | C23C 4/04 428/319.1 |
| 2011/0243716 | A1 * | 10/2011 | Strock | F01D 11/12 415/173.4 |
| 2013/0078085 | A1 * | 3/2013 | Strock | F01D 11/122 415/173.4 |
| 2014/0093360 | A1 | 4/2014 | Strock | |
| 2016/0355921 | A1 | 12/2016 | Beaudoin et al. | |

FOREIGN PATENT DOCUMENTS

| | | | |
|---|---|---|---|
| EP | 2574727 A1 | 3/2013 | |
| EP | 2574727 A1 * | 4/2013 | ............ F01D 11/122 |

OTHER PUBLICATIONS

Tech data sheet Hexagonal boron nitride, MK impex Canada, pp. 1-2, 2016.*

Metco 52C-NS datasheet, Metco Co, pp. 1-3, DSMTS-0045.5, 2016. (Year: 2016).*

Tech data sheet Hexagonal boron nitride, MK impex Canada, pp. 1-2, 2016 (Year: 2016).*

European Search Report and Communication for EP 16 17 1824; dated Sep. 16, 2016; 8 pages.

Metco 52C-NS Datasheet, Metco Co, "Alumnum 12% Silicon Thermal Spray Powders", DSMTS-0045.5, pp. 1-3, 2016.

Tech Data Sheet: Hexagonai Boron Nitride (hBN) Powder, MK impex Canada, pp. 1-2, 2016.

* cited by examiner

ABRADABLE SEAL AND METHOD OF PRODUCING A SEAL

CROSS REFERENCE TO RELATED APPLICATIONS

This application is a Continuation of U.S. application Ser. No. 14/728,631, filed Jun. 2, 2015, which is incorporated by reference herein in its entirety.

TECHNICAL FIELD OF THE DISCLOSURE

The present disclosure is generally related to seals and, more specifically, to an abradable seal and a method of producing a seal.

BACKGROUND OF THE DISCLOSURE

Gas turbine engines are well known sources of power, e.g., motive power for aircraft or as power generators, and generally include compressor (typically preceded by one or more fan stages), combustor and turbine sections. FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 m/sec).

As illustrated generally in FIG. 2, compressor section 24 and turbine section 28 (and any fan stages 22) each include shaft-mounted, rotating disks 1, each carrying a set of blades 2 located within static structure 36, with intervening sets of stationary vanes 5 mounted to the static structure 36. Air seals 4, 7 are provided between the tips of the blades 2 and the static structure 36 (outer air seals), and between the free ends 6 of the vanes 5 and the knife edges 8 of the disks 1 (knife edge seals) to prevent air leakage between those components.

Air is ingested through the core flow path C and compressed by rotating disks 1 and associated blades 2 in the compressor section 24. The compressed air is then burned with fuel in the combustor section 26 to generate high pressure and temperature gasses, which cause rotation of the turbine section 28 and associated fan section 22 and compressor section 24 and are then ejected out an engine exhaust to provide thrust. The static structure 36 is intended to prevent leakage of air or combustion products around the tips of the blades 2, i.e., between the blade 2 tips and the static structure 36, which leakage reduces the efficiency of the engine 20.

Despite the design of components to minimize leakage, a substantial proportion of any leakage which does occur in a normally-operating gas turbine engine occurs between the tips of the blades 2 and the static structure 36, and between the tips of the vanes 5 and the disks 1. One manner of eliminating such leakage is to fabricate all mating parts to extremely close tolerances, which becomes increasingly expensive as tolerances are reduced. Moreover, given the temperature ranges to which the parts are subjected to before, during and after operation, and the resultant thermal expansion and contraction of the parts, such close tolerances will at times result in interference between mating parts and corresponding component wear and other damage. Accordingly, gas turbine engine designers have devoted significant effort to developing effective air seals, and particularly seals composed of abradable materials. Such seals require a balance of several properties including abradability upon being contacted by a rotating blade 2 tip, erosion resistance, durability, thermal expansion balanced with that of the underlying material, and relative ease and reasonable cost of manufacture.

A typical compressor air seal includes a seal substrate, e.g., a metal substrate, a metal bond layer composed of a metal powder plasma sprayed onto the substrate, and an abradable, sealing layer which is also typically plasma sprayed onto the metal bond layer. A typical sealing layer includes a metal matrix of aluminum and silicon with some amount of embedded methyl methacrylate powder particles. Because a galvanic cell is formed between the aluminum and silicon, the abradable sealing layer is subject to environmental aqueous corrosion, thereby possibly compromising the performance of the sealing layer.

Improvements in seal design are therefore needed in the art.

SUMMARY OF THE DISCLOSURE

In one embodiment, an air seal is disclosed, comprising: an abradable seal layer consisting essentially of thermally sprayed aluminum powder forming a metal matrix, and co-deposited methyl methacrylate filler particles embedded in the metal matrix.

In a further embodiment of the above, the air seal further comprises a seal substrate; and a thermally sprayed metal bond layer applied to at least a portion of the seal substrate, the metal bond layer composed of thermally sprayed powder; wherein the abradable seal layer is applied to the metal bond layer.

In a further embodiment of any of the above, the air seal is an outer air seal of a gas turbine engine.

In a further embodiment of any of the above, the air seal is a knife edge seal of a gas turbine engine.

In a further embodiment of any of the above, the thermal spray comprises a plasma spray.

In a further embodiment of any of the above, the aluminum powder particles are composed of at least about 99 weight percent aluminum powder.

In a further embodiment of any of the above, the abradable layer is composed of between about 30 to about 60 volume percent aluminum.

In a further embodiment of any of the above, the abradable layer is composed of between about 40 to about 50 volume percent aluminum.

In another embodiment, an air seal is disclosed, comprising: an abradable seal layer comprising a metal matrix, and co-deposited hexagonal boron nitride filler particles and methyl methacrylate filler particles embedded in the metal matrix, wherein the metal matrix consists essentially of thermally sprayed aluminum powder.

In a further embodiment of any of the above, the air seal further comprises: a seal substrate; and a thermally sprayed metal bond layer applied to at least a portion of the seal substrate, the metal bond layer composed of thermally sprayed powder; wherein the abradable seal layer is applied to the metal bond layer.

In a further embodiment of any of the above, the air seal is an outer air seal of a gas turbine engine.

In a further embodiment of any of the above, the air seal is a knife edge seal of a gas turbine engine.

In a further embodiment of any of the above, the thermal spray comprises a plasma spray.

In a further embodiment of any of the above, the aluminum powder particles are composed of at least about 99 weight percent aluminum powder.

In a further embodiment of any of the above, the abradable layer is composed of between about 30 to about 60 volume percent aluminum.

In a further embodiment of any of the above, the abradable layer is composed of between about 33 to about 40 volume percent aluminum.

In a further embodiment of any of the above, the abradable layer is composed of up to about 15 volume percent hexagonal boron nitride.

In a further embodiment of any of the above, the abradable layer is composed of between about 0.3 to about 4 volume percent hexagonal boron nitride.

In a further embodiment of any of the above, the hexagonal boron nitride comprises an agglomerate containing up to about 15 volume percent bentonite clay.

In a further embodiment of any of the above, the hexagonal boron nitride comprises an agglomerate containing about 10 volume percent bentonite clay.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
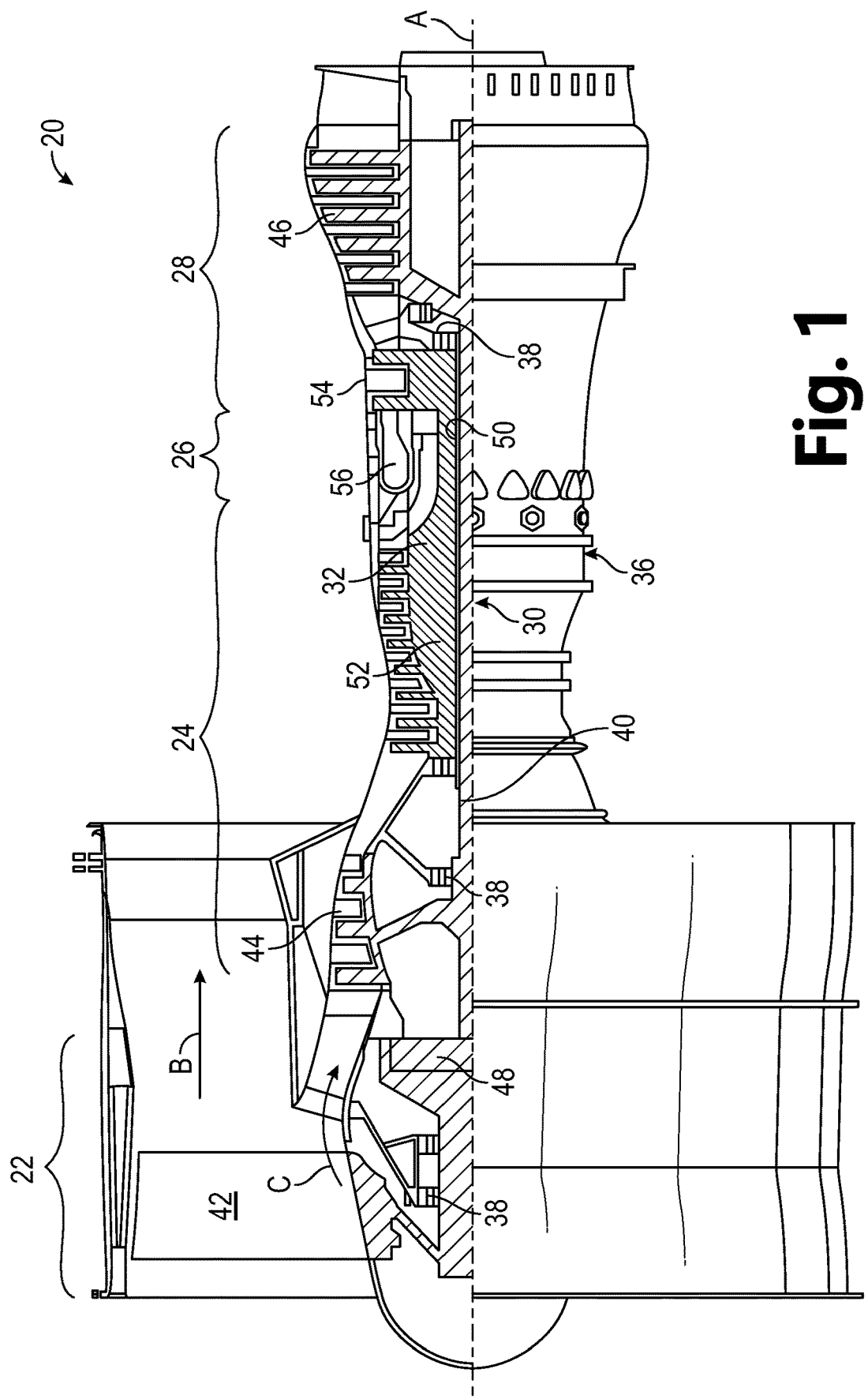
FIG. 1 is a schematic cross-sectional view of a gas turbine engine.
Figure 2:
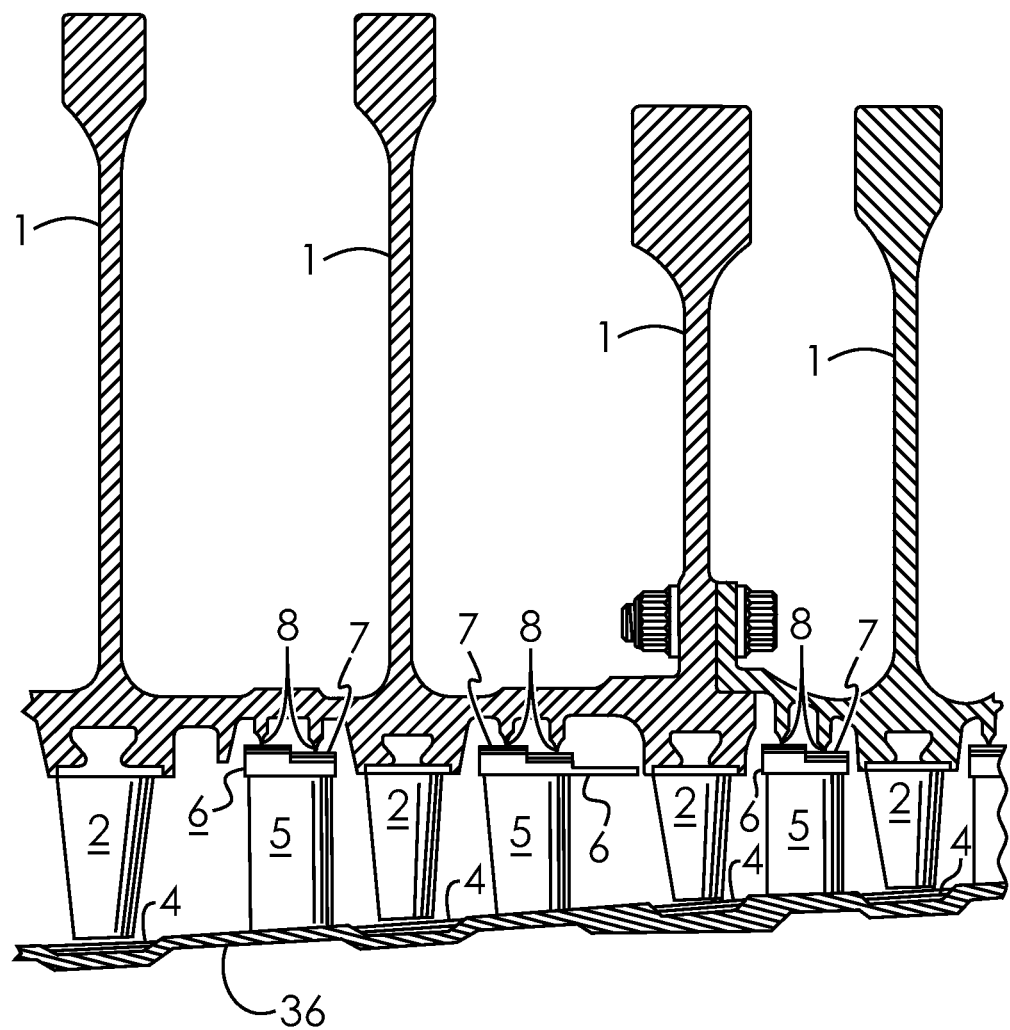
FIG. 2 is a schematic cross-sectional view of rotating blades and stationary vanes in an embodiment.
Figure 3:
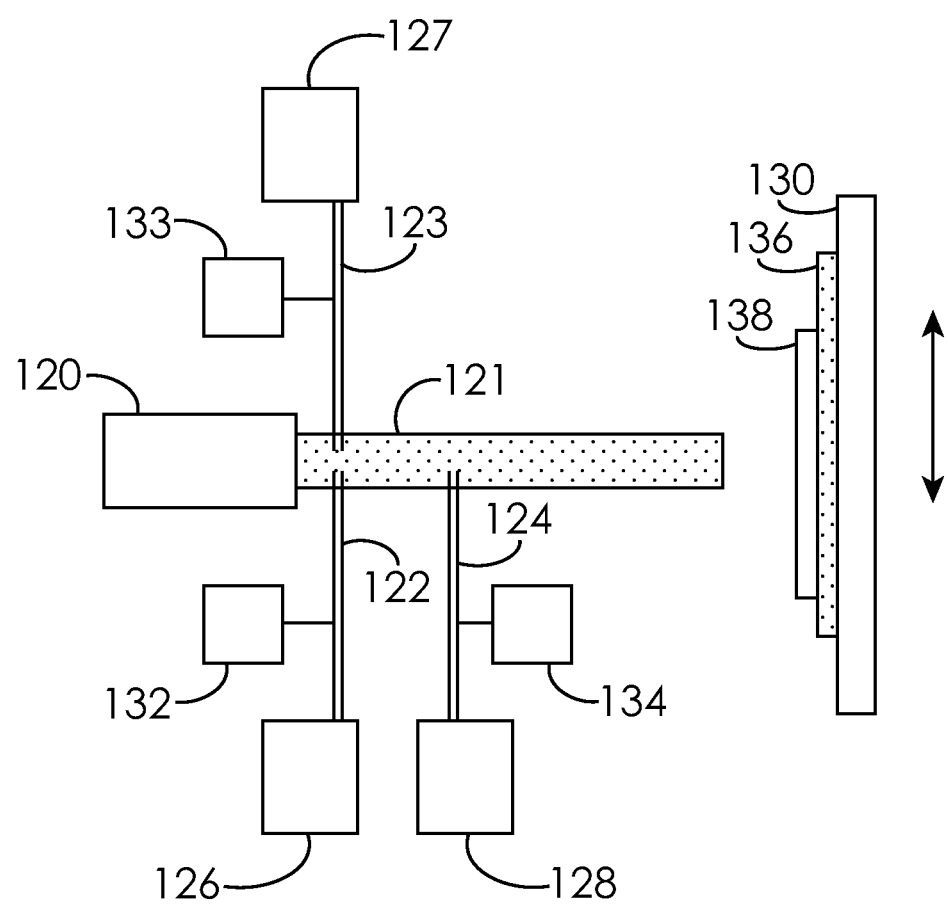
FIG. 3 is a schematic view of a seal and a plasma torch for producing the seal in an embodiment.

Turning now to FIG. 3, a plasma spray apparatus in an embodiment includes a torch 120 (including a power source and spray head, neither shown separately from the apparatus generally), and at least three powder delivery lines 122, 123, 124. The torch is capable of simultaneously delivering and spraying at least two separate powders into a flame 121, see, e.g., commonly-owned U.S. Pat. No. 4,696,855 to Pettit, Jr. et al, which is expressly incorporated by reference herein. The lines 122, 123, 124 are coupled respectively to powder material hoppers 126, 127, 128 which contain the powder to be deposited onto a substrate 130, and respective sources 132, 133, 134 of carrier gas such as argon, which deliver the powder from the hoppers into the plasma torch plume 121. Typical substrate 130 materials include titanium alloys, as well as nickel base, cobalt base and iron base superalloys and combination of these materials, although the present disclosure is not intended to be limited to such materials. Plasma spray apparatus generally are known in the art, and accordingly have not been described in detail herein. We have used a model 3 MB manufactured by Oerlikon Metco in Westbury, N.Y. to produce seals in accordance with the present disclosure. While the present disclosure is described in connection with an outer air seal, it may be equally applied to a knife edge seal system (e.g., FIG. 2 at 7, 8), or other suitable application.

In an embodiment, the powder for providing a metal bond layer 136 on the substrate 130 is a blend of aluminum and nickel powder. The powder is sold under different names, such as 450-NS or AMDRY 956 from Oerlikon Metco. The powder is typically a composited powder (particles of one being bound to the other) composed, in weight percent of between about 3.5-6 (and between 4-5.5 in some embodiments) aluminum, up to about 3 (and less than 2.5 in some embodiments) organic binder, balance nickel. The powder may also include other materials, such as up to about 19 wt. % chromium in place of some of the nickel. An alternate metal powder has a nominal composition, by weight, of about 69.5 nickel, 18.5 chromium and about 6 aluminum. In an embodiment, the powder particle size is −325+140 mesh (between approximately 45 and approximately 105 micrometers in diameter).

The powder which forms the metal bond layer 136 is stored in a hopper 126, and a carrier gas such as argon or nitrogen is provided from a source 132, to carry the powder through a line 122, to introduce the powder to the torch 120 as a single source. In an embodiment, a combination of argon and hydrogen is used as the arc gas for the torch. The powder is deposited on the substrate 130 to form the metal bond layer 136 of a thickness of between about 0.002-0.012 inch, and in some embodiments, between about 0.003-0.006 inch. In some embodiments, the metal bond layer 136 is formed from the metal used in the abradable layer 138, less the non-metal additives. In other embodiments, the metal bond layer 136 is not used.

In an embodiment, the powder for providing an abradable layer 138 is a combination of aluminum powder, and methyl methacrylate powder. The aluminum powder is sold under different names, such as 54NS by Oerlikon Metco. The powder is 99.0+ weight percent aluminum. In an embodiment, the powder particle size is −170+325 mesh (between approximately −90 and approximately +45 micrometers in diameter).

In an embodiment, the methyl methacrylate powder is sold by ICI Acrylics of Wilmington, Del. grade 4F or 6751. Preferably, the powder particles substantially all (at least about 90% by weight) are smaller than 125 micrometers and most (at least about 65% by weight) are smaller than 63 micrometers.

In an embodiment, the powder which forms an abradable layer 138 is co-deposited, e.g., introduced separately into the plasma. Co-depositing enables the relative amounts of aluminum powder and methyl methacrylate powder to be adjusted as desired. In an embodiment, a combination of argon and hydrogen is used as the arc gas.

The aluminum powder is stored in a hopper 127, and a carrier gas such as argon or nitrogen is provided from a source such as the source 133, to carry the powder through a line such as line 123, to introduce the powder to the torch 120. The methyl methacrylate powder is stored in a hopper 128, and a carrier gas such as argon or nitrogen is provided from a source such as the source 134, to carry the powder through a line such as line 124, to introduce the powder into the spray stream produced by the torch 120 downstream of the aluminum powder. The aluminum and methyl methacrylate are deposited on the substrate 130 to form the abradable layer 138 to a desired thickness plus some excess thickness (at least 0.025 inch in one embodiment) to allow for subsequent machining of the seal. Other types of processes may be used to apply the metal bond layer 136 and the abradable layer 138, such as high velocity oxygen fuel spraying (HVOF), to name just one non-limiting example.

An alternate next step is to remove the methyl methacrylate from the abradable layer 138 in applications where it is desired to reduce the amount of dust produced during a rub of the seal. The next step is accordingly a heat treatment, in which the seal is heated to a temperature of about 600° F. for at least about 4 hours. The porosity of the resulting seal is a function of the filler content.

In an embodiment, the abradable layer is fed to the torch 120 at a mass flow rate of about 60 g/minute, and the methyl methacrylate is fed at a mass flow rate of about 17 g/minute. The amount of methyl methacrylate in the abradable layer 138 may be varied to achieve the density desired in the finished layer 138. The layer 138 may comprise about 30-60 vol % (and in some embodiments about 40-50 vol %) aluminum with the balance being methyl methacrylate. Where no heat treatment is performed, the seal in some embodiments has a hardness of about HR15Y 20-85 (and in some embodiments about HR15Y 40-70). Heat treating the seal reduces the hardness. For example, heat treating a seal with an initial hardness of about HR15Y 80 will result in a hardness of about HR15Y 55 after heat treating.

An advantage of some of the presently disclosed embodiments is that the seal provides both acceptable durability and abradability, and also will not deflagrate during off-design operation during which significant amounts of seal material is ingested into the engine. Some of the presently disclosed embodiments are resistant to environmental aqueous corrosion, exhibit greater ductility and lower modulus than abradable layers made with aluminum-silicon materials for increased fatigue resistance. The increased ductility may cause more material transfer to the blades 2, which can be counteracted as necessary by adding hexagonal boron nitride to the abradable layer 138.

In one embodiment, an abradable composition containing aluminum matrix, methylmethacrylate and hexagonal boron nitride may comprise about 30-60 vol % aluminum (and in some embodiments about 33-40 vol %), up to about 15 vol % hexagonal boron nitride (and in some embodiments about 0.3-4 vol %) with the remainder being methyl methacrylate. In some embodiments, the aluminum and hexagonal boron nitride comprise a composited powder. In some embodiments, the hexagonal boron nitride comprises an agglomerate containing up to about 15 vol % bentonite clay (and in some embodiments about 10 vol %), where the bentonite clay is considered part of the hexagonal boron nitride fraction in the vol % s listed above.

The seal of the presently disclosed embodiments is additionally cost effective, and does not weigh any more than conventional seal materials. The seal can be applied using conventional plasma spray apparatus, and the process of providing such a seal enables adjustment of the proportion of metal and of filler, to provide an optimal seal adapted for different operating conditions. By co-spraying the metal and the filler, we produce a seal having uniformly finer distributed constituents in its microstructure.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. An air seal comprising a porous abradable seal layer formed by thermally spraying a powder consisting essentially of aluminum powder which forms a metal matrix, co-depositing methyl methacrylate filler particles in the metal matrix, and removing the methyl methacrylate filler particles.

2. The air seal of claim 1, further comprising: a seal substrate; and a thermally sprayed metal bond layer applied to at least a portion of the seal substrate, the metal bond layer composed of thermally sprayed powder; wherein the abradable seal layer is applied to the metal bond layer.

3. The air seal of claim 1, wherein the air seal is an outer air seal of a gas turbine engine.

4. The air seal of claim 1, wherein the air seal is a knife edge seal of a gas turbine engine.

5. The air seal of claim 1, wherein the thermal spray comprises a plasma spray.

6. The air seal of claim 1, wherein the aluminum powder is at least about 99 weight percent aluminum powder.

7. The air seal of claim 1, wherein the abradable layer comprises about 30 to about 60 volume percent aluminum.

8. The air seal of claim 7, wherein the abradable layer comprises about 40 to about 50 volume percent aluminum.

9. An air seal comprising a porous abradable seal layer formed by thermally spraying a powder consisting essentially of aluminum powder which forms a metal matrix, co-depositing hexagonal boron nitride filler particles and methyl methacrylate filler particles in the metal matrix, and removing the methyl methacrylate filler particles.

10. The air seal of claim 9, further comprising: a seal substrate; and a thermally sprayed metal bond layer applied to at least a portion of the seal substrate, the metal bond layer comprising a thermally sprayed powder; wherein the abradable seal layer is applied to the metal bond layer.

11. The air seal of claim 9, wherein the air seal is an outer air seal of a gas turbine engine.

12. The air seal of claim 9, wherein the air seal is a knife edge seal of a gas turbine engine.

13. The air seal of claim 9, wherein the thermal spray comprises a plasma spray.

14. The air seal of claim 9, wherein the aluminum powder particles comprise at least about 99 weight percent aluminum powder.

15. The air seal of claim 9, wherein the abradable layer comprises about 30 to about 60 volume percent aluminum.

16. The air seal of claim 15, wherein the abradable layer comprises about 33 to about 40 volume percent aluminum.

17. The air seal of claim 15, wherein the abradable layer comprises up to about 15 volume percent hexagonal boron nitride.

18. The air seal of claim 17, wherein the abradable layer comprises about 0.3 to about 4 volume percent hexagonal boron nitride.

19. The seal of claim 17, wherein the hexagonal boron nitride comprises an agglomerate comprising up to about 15 volume percent bentonite clay.

20. The seal of claim 19, wherein the hexagonal boron nitride comprises an agglomerate comprising about 10 volume percent bentonite clay.

* * * * *